July 15, 1958  J. A. DEL FRANCIA  2,843,716
ELECTRICALLY HEATED COOKING EQUIPMENT
Filed July 6, 1956
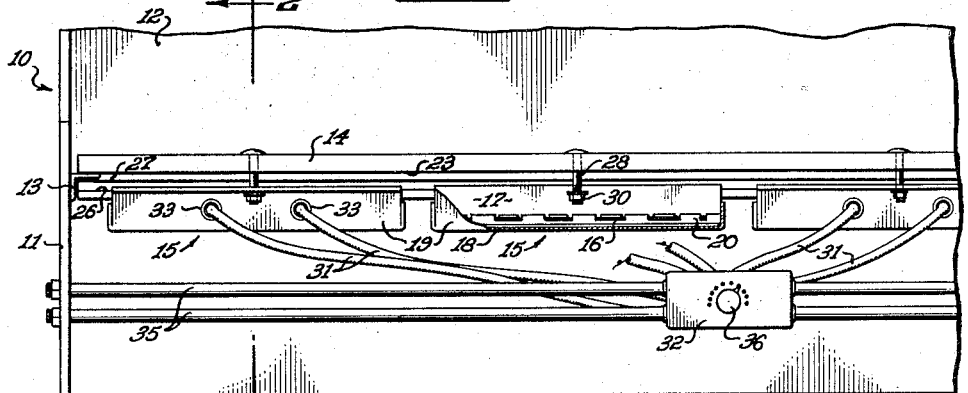
Fig. 1.
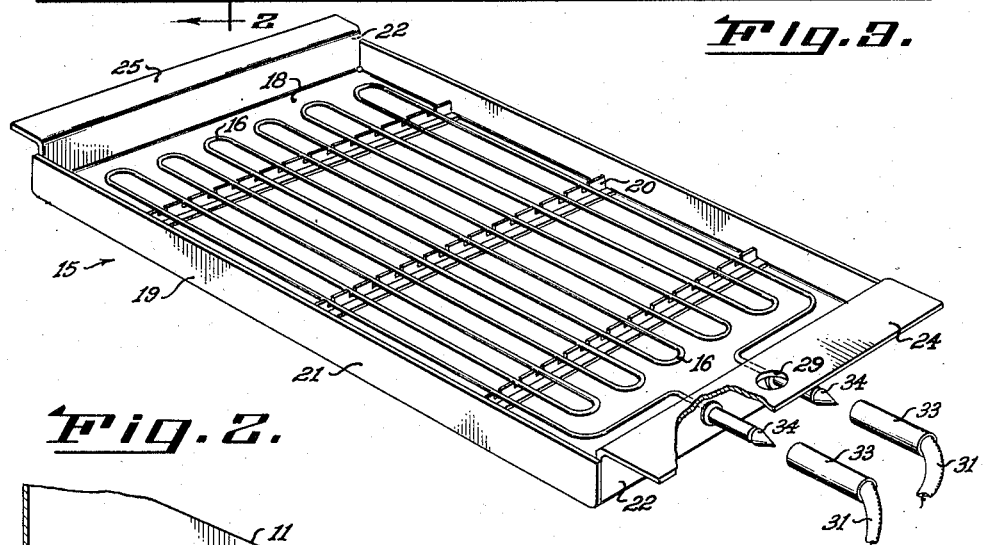
Fig. 2.
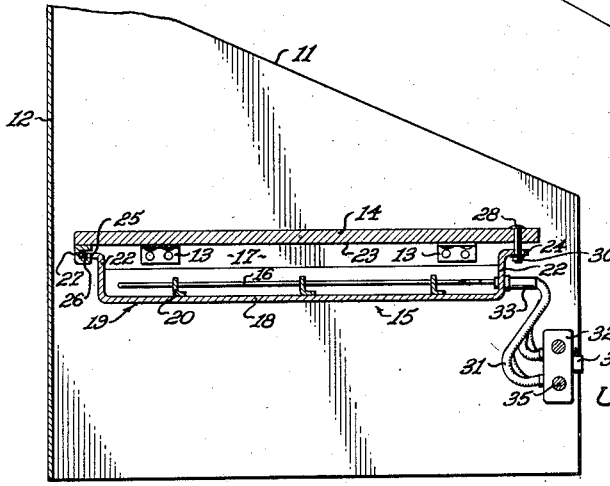
JOEL A. DEL FRANCIA
INVENTOR.
BY
ATTORNEY

United States Patent Office 2,843,716
Patented July 15, 1958

2,843,716
ELECTRICALLY HEATED COOKING EQUIPMENT

Joel A. Del Francia, Los Angeles, Calif.

Application July 6, 1956, Serial No. 596,268

20 Claims. (Cl. 219—37)

This invention relates generally to cooking equipment of the type in which a heated griddle or grid plate is utilized, and more particularly has to do with multiple electrically energizable heating units adapted for such combination with relatively large heavy griddles such as are used in restaurants that the units are accessible from the front of the griddle and individually removable from heating positions beneath the griddle without first having to displace the latter, so as to leave selected units for heating only certain selected portions of the griddle. The invention is also concerned with the provision of novel heating units to be individually movable into such underlying relation to the griddle as to secure utmost favorable heat concentration and distribution at the underside thereof.

In carrying out the invention, it is a major object thereof to provide a degree of versatility and practicality in the use and operation of electrically heated griddle-type cooking equipment that is unknown in standard apparatus of this general class at the present time. In particular, the utility of conventional griddles and heaters therefor is lessened to the extent that such heaters are relatively permanently connected to the griddles, making them difficult of replacement, and where the heaters are removable it is usually found necessary to lift or otherwise move the heavy griddle itself to accomplish such removal.

The present invention seeks to do away with the above-mentioned objectionable features found in ordinary griddles and heaters, through the provision of improved multiple heating units that include electrically energizable radiant heaters supported for movement under different portions of the griddle into heating positions spaced therebeneath, as well as heat reflectors operative to reflect radiant heat upwardly into the space directly below the griddle for distribution over the underside thereof. Further, the invention includes means connecting the heating units in such underlying relation to different portions of the griddle that the heating units are accessible to the operator at the front of the griddle and are releasable to permit separate removal of the heating units from their positions without requiring displacement of the relatively heavy griddle, so that the units may be conveniently replaced. Also, means for supplying electrical current to the units are detachably connected with the heaters enabling electrical disconnection of selected heating units to leave only certain selected heaters for heating desired portions of the griddle.

Other features and objects of the invention, as well as the details of a typical embodiment thereof, will be understood more fully from the following detailed description of the accompanying drawings, in which Fig. 1 is an elevation showing the front of the griddle housing and griddle together with a sectional showing of one of the heating units for the griddle;

Fig. 2 is a side elevation taken in section through the griddle housing, griddle and one of the heating units; and Fig. 3 is a perspective showing of a preferred form of the heating unit.

Referring first to the general showings of Figs. 1 and 2, the apparatus comprises an outer housing structure, generally indicated at 10, which includes side walls 11 and rear wall 12 forming an essentially box-like structure having an open top and front. Angle frame pieces 13 at the side walls support a horizontally extending, relatively heavy metal griddle or grid plate 14, which may be of large size rectangular construction and relatively elongated lengthwise for convenient use in cooking and from the front of the griddle, the terms griddle and grid plate being used interchangeably in the specification.

Combined with the griddle in directly underlying relation therewith are a number of heating units generally indicated at 15, each of which includes an electrically energizable heater 16 and a heat reflector below the heater for reflecting radiated heat upwardly into the space 17 between the heater and the griddle, the reflector being shown in the form of a sheet metal bottom 18 of a shallow receptable or tray indicated at 19. The heater itself preferably extends in a plane parallel to and beneath the griddle, and may comprise a heavy-duty coil, a tubular heater or the like, having open formation for passing reflected heat from the tray bottom 18 upwardly into the space 17 for distribution against the griddle underside. As shown in Fig. 3, the stretches of the heater coil run back and forth in relatively horizontally spaced relation within the tray 19, and are supported in spaced condition above the tray bottom by three upstanding ribs 20 which are notches to receive the stretches of the coil.

The side and end walls 21 and 22 of the heating tray extend upward sufficiently to confine the air within the tray and surrounding the heater beneath the griddle underside 23, so that as the air becomes heated by radiation and reflection of heat, the air will in turn tend to rise by convention within space 17 for contact with the griddle underwise 23 and transfer heat thereto. Thus heat is efficiently distributed against the griddle underside by direct radiation from the heaters, reflection from the tray bottom 18 and by thermal convection currents within space 17. For efficient reflection of heat, the tray is desirably formed of aluminum or an alloy thereof, such lightweight metallic composition also facilitating forming of the tray as by bending its side and end walls.

The invention is particularly concerned with the manner of connecting each of the heating units in combined operative relation with the heavy griddle 14 so as to permit their removal from beneath the griddle without requiring displacement of the griddle as by lifting thereof. For this purpose, each of the trays is provided with front and rear tongues 24 and 25 extending respectively frontwardly and rearwardly relative to the griddle itself for connection therewith. The tongues may be formed as shown by bending the end walls of the tray outwardly and relatively oppositely to provide an integral tray construction. The rearward tongue 25 is adapted for insertion into a groove 26 running horizontally within a support 27 depending from the rearward side of the griddle, the groove 26 opening relatively forwardly for easy forward removal of the tongue 25 and tray from its underlying position below the griddle. The forward tongue 24 is detachably connected with the forward portion of the griddle, as by a bolt 28 extending downward from the griddle through an opening 29 in the tongue. The latter is held in connected relation with the bolt as by a nut 30 threaded onto its lower end and quickly releasable from the front side of the griddle to permit removal of the heating unit toward that side.

Each of the heating units is individually connected with a source of electrical current through pairs of flexible wires or leads 31 running between a control head 32 and pairs of sockets 33 adapted to receive projections 34 carried by the heating units. The pair of projections 34 is electrically connected with the heating coil within each unit, and as shown in Fig. 3 the projections extend relatively forwardly beneath the forward tongue 24 of each heating unit. While only one control head 32 is illustrated, it is contemplated that a similar head for each heating unit may be provided, as by their mounting on the parallel bars 35 running horizontally between the side walls 11 of the housing. The control head shown in Fig. 1 has a knob 36, which when turned may operate a suitable switch alone or with a rheostat to supply fixed or variable amounts of current to the heater coils.

When, during the course of cooking, it becomes desirable to heat only certain portions of the griddle, the electrical sockets 33 may be quickly disconnected from the projections 34 of selected heaters, leaving the remaining heaters operating to heat the desired portions of the griddle, thereby achieving a saving both as to the amount of electrical current used and as to the life of the heating units. Should any unit become inoperative for any reason whatever, it may be quickly removed from its position underlying the griddle by releasing the forward connection comprising the nut 30 holding the forward tongue 24 of the heating unit in position and dropping the tongue below the bolt to permit forward removal of the heating unit, all without lifting the griddle. A replacement heating unit may then be quickly moved into heating position, connected with the griddle and electrically connected with the control head 32 by snapping the sockets 33 over its projections 34.

I claim:

1. The combination comprising a relatively heavy horizontally extending grid plate, a plurality of heating units for the plate each including an electrically energizable radiant heater having open formation and a heat reflector located directly below the plate to radiate and reflect radiated heat upwardly through the heater formation for distribution over the plate underside, said reflector comprising a horizontally extending tray structure supporting said heater, and means individually connecting said heating units to front and rear portions of the plate in such underlying relation thereto that the connecting means are directly accessible from the front thereof and releasable to permit separate removal of the units from said underlying condition without displacement of the plate.

2. The invention as defined in claim 1 comprising forward threaded and rearward tongue and groove connections.

3. The combination, comprising a housing, a relatively heavy horizontally extending grid plate carried by the housing, a plurality of heating units for the plate each including an electrically energizable radiant heater having open formation and a plurality of horizontally extending heat reflector trays located directly below the plate to radiate and reflect radiated heat upwardly through the heater formation for distribution over the plate underside, said trays supporting said heaters, and means individually detachably connecting said heating units in such underlying relation to different portions of the plate that the connecting means are directly accessible from the front thereof and releasable to permit separate removal of the units from said underlying condition and from the housing without displacement of the plate relative to the housing.

4. The invention as defined in claim 3 including separate electrical connections with the heaters for supplying electrical current thereto and disconnectible therefrom at the front of said units to permit said separate removal thereof.

5. The invention as defined in claim 3 in which the heaters are spaced from and between the reflecting surfaces of the trays and the underside of the plate.

6. The invention as defined in claim 3 in which each tray extends in such proximity to the plate underside that air within said space is essentially confined for transferring heat the plate underside.

7. The invention as defined in claim 5 comprising aluminum trays.

8. The combination comprising a housing, a relatively heavy upwardly facing grid plate carried by the housing, heating means including an electrically energizable heater element in heating position directly below the plate to radiate heat upwardly against the plate underside and a heat reflecting tray structure directly underlying the heater element in supporting relation therewith, said element having open formation and being openly exposed to the grid plate and tray whereby heat radiation passes directly upward from the heater element to the plate and substantially all upwardly reflected radiation passes openly from the tray to the plate, and means detachably securing said heating means in such underlying relation to the plate that the securing means is accessible from the front thereof and releasable to permit removal of said heater from said underlying condition and from the housing without displacement of the plate relative to the housing.

9. The combination comprising a housing, a relatively heavy upwardly facing grid plate carried by the housing, heating means for the plate including an electrically energizable heater element and a heat reflecting tray structure in heating position directly below the plate to radiate and reflect radiated heat upwardly against the plate underside, said tray directly underlying the heater element in supporting relation therewith and said element having open formation and being openly exposed to the grid plate and tray whereby heat radiation passes directly upwardly from the heater element to the grid and substantially all upwardly reflected radiation passes openly from the tray to the plate, and means detachably securing said heating means to the plate in such underlying relation thereto that the securing means is accessible from the front thereof and releasable to permit removal of said heating means from said underlying condition and from the housing without displacement of the plate relative to the housing.

10. The combination, comprising a housing, a relatively heavy horizontally extending grid plate carried by the housing, a plurality of heating units for the plate each including an electrically energizable heater element and a heat reflecting tray structure respectively spaced directly below the plate to radiate and reflect radiated heat upwardly into said space against the plate underside, said tray directly underlying the heater element in supporting relation therewith and said element having open formation and being openly exposed to the grid plate and tray whereby heat radiation passes directly upwardly from the heater element to the grid and substantially all upwardly reflected radiation passes openly from the tray to the plate, and means detachably connecting said heating units in such underlying relation to different portions of the plate that the connecting means are accessible from the front thereof and releasable to permit separate removal of said units from said underlying condition and from the housing without displacement of the plate relative to the housing.

11. The combination, comprising a housing, a relatively heavy horizontally extending grid plate carried by the housing, a plurality of heating units for the plate each including an electrically energizable heater element and a heat reflecting tray structure respectively spaced directly below the plate to radiate heat and reflect radiated heat upwardly into said space against the plate underside, said tray directly underlying the heater element in supporting relation therewith and said element having open formation and being openly exposed to the grid plate and tray whereby heat radiation passes directly upwardly from the heater element to the grid and substantially all upwardly reflected radiation passes openly from the tray to the plate, means detachably connecting said heating units in such underlying relation to different portions of the plate that the connecting means are accessible from the front thereof and releasable to permit separate removal of said units from said underlying condition and from the housing without displacement of the plate relative to the housing, and means detachably connected with said heating units for supplying electrical current to said heaters.

12. The combination comprising a housing, a relatively heavy horizontally extending grid plate carried by the housing, a plurality of heating units for the plate each including an electrically energizable radiant heater element and a heat reflecting tray structure located directly below the plate to radiate and reflect radiated heat upwardly for distribution over the plate underside, said tray directly underlying the heater element in supporting relation therewith and said element having open formation and being openly exposed to the grid plate and tray whereby heat radiation passes directly upwardly from the heater element to the grid and substantially all upwardly reflected radiation passes openly from the tray to the plate, and means individually detachably connecting said heating units in such underlying relation to different portions of the plate that the connecting means are directly accessible from the front thereof and releasable to permit separate removal of the units from said underlying condition and from the housing without displacement of the plate relative to the housing.

13. Heating means for a relatively heavy horizontal grid plate, comprising an assembly including an electrically energizable radiant heater element having open formation and a horizontally extending tray structure including a heat reflector supporting the heater element for movement under the plate into heating position spaced directly therebeneath, said element being openly exposed to the grid plate, and a connection carried by said assembly to be accessible from the plate front for holding the assembly in said position and releasable to permit removal of the assembly to said front without displacement of the plate.

14. Heating means for a relatively heavy horizontal grid plate, comprising an assembly including an electrically energizable radiant heater element having open formation, a tray structure supporting the heater for movement under the plate into heating position spaced directly therebeneath including a heat reflector facing the heater to reflect radiated heat through the heater formation and into said space for distribution against the plate underside, said element being openly exposed to the grid plate, and a connection carried by said assembly to be accessible from the plate front for holding the assembly in said position and releasable to permit removal of the assembly to said front without displacement of the plate.

15. Heating means for a relatively heavy horizontal grid plate, comprising an assembly including an electrically energizable radiant heater element having open formation, a horizontally extending tray srtucture supporting the heater in a plane for movement under the plate into heating position spaced directly below the plate and parallel thereto including a heat reflector facing the heater to reflect radiated heat through said heater formation and into said space for distribution against the plate underside, said element being openly exposed to the grid plate, and a connection carried by said assembly to be accessible from the plate front for holding the assembly in said position and releasable to permit removal of the assembly to said front without displacement of the plate.

16. The invention as defined in claim 15 including an electrical connection carried by the assembly to be accessible at the front of the plate when the heater element is in said position for releasable connection with a source of electrical current.

17. The invention as defined in claim 15 comprising a horizontally extending metallic tray supporting the heater in a horizontal plane above the tray bottom.

18. Heating means for a grid plate, comprising an assembly including an electrically energizable radiant heater having open formation, a horizontally extending metallic tray structure supporting the heater in a horizontal plane above the tray bottom for movement under the plate into heating position spaced directly below the plate and parallel thereto, said tray structure including a heat reflector facing the heater to reflect radiated heat through said heater formation and into said space for distribution against the plate underside, said tray having a rim extending sufficiently above the heater plane that the tray structure in said heating position acts to confine heated air within said space for transferring heat to the plate underside, and a connection carried by said assembly to be accessible from the plate front for holding the assembly in said position and releasable to permit removal of the assembly to said front without displacement of the plate.

19. The invention as defined in claim 18 comprising connections at the front and rear of the tray.

20. The invention as defined in claim 18 comprising an aluminum tray.

References Cited in the file of this patent

UNITED STATES PATENTS

| | | |
|---|---|---|
| 1,463,903 | Mitchell | Aug. 7, 1923 |
| 1,533,240 | Forshee | Apr. 14, 1925 |
| 1,685,030 | Lavoie | Sept. 18, 1928 |
| 1,711,472 | Lewin | Apr. 30, 1929 |
| 1,843,455 | McGowen | Feb. 2, 1932 |
| 2,702,848 | Scofield et al. | Feb. 22, 1955 |